(12) United States Patent
Suginoshita et al.

(10) Patent No.: US 7,016,890 B2
(45) Date of Patent: Mar. 21, 2006

(54) DATABASE SYSTEM, METHOD FOR FORMING REPLICA OF DATABASE, AND COMPUTER-READABLE RECORDING MEDIUM THAT RECORDS DATABASE REPLICA FORMING PROGRAM

(75) Inventors: Hiroshi Suginoshita, Yokohama (JP); Masayuki Kikuchi, Yokohama (JP); Masao Hosoya, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 112 days.

(21) Appl. No.: 09/739,790

(22) Filed: Dec. 20, 2000

(65) Prior Publication Data

US 2001/0018692 A1 Aug. 30, 2001

(30) Foreign Application Priority Data

Dec. 21, 1999 (JP) ............................................ 11-362997

(51) Int. Cl.
*G06F 17/30* (2006.01)

(52) U.S. Cl. ................................ 707/1; 707/3; 707/10; 709/224

(58) Field of Classification Search ................. 707/10, 707/201, 1, 3, 5, 104.1; 709/224, 226; 710/28
See application file for complete search history.

(56) References Cited

U.S. PATENT DOCUMENTS 4,769,636 A * 9/1988 Iwami et al. ............... 345/790
5,954,803 A * 9/1999 Nakai et al. .................... 710/28
5,987,234 A * 11/1999 Hirosawa et al. ............ 709/224
5,995,980 A * 11/1999 Olson et al. ................... 707/10
6,122,630 A * 9/2000 Strickler et al. ............... 707/10
6,272,544 B1 * 8/2001 Mullen ........................ 709/226
6,374,262 B1 * 4/2002 Kodama ...................... 707/201
6,396,963 B1 * 5/2002 Shaffer et al. ................. 707/1
6,438,554 B1 * 8/2002 Di-Crescenzo et al. ........ 707/10
6,438,563 B1 * 8/2002 Kawagoe ..................... 707/201

FOREIGN PATENT DOCUMENTS

| JP | 05120110 | 5/1993 |
|---|---|---|
| JP | 07141241 | 6/1995 |
| JP | 07311701 | 11/1995 |
| JP | 09325863 | 12/1997 |

OTHER PUBLICATIONS

C.J. Date An Introduction To Database Systems vol. I Fifth Edition pp. 616–635.
"The Asynchronous Update of Replica Files Growing a Central Technology of Distributed Databases", Nikkei Electronics, Jun. 6, 1994, No. 609, pp. 101–110.

* cited by examiner

*Primary Examiner*—Charles Rones
*Assistant Examiner*—Hassan Mahmoudi
(74) *Attorney, Agent, or Firm*—Mattingly, Stanger, Malur & Brundidge, P.C.

(57) ABSTRACT

The preferential order to be applied in replica forming processing for the data of a plurality of types is stored when a replica of a master database that stores the data of a plurality of types is prepared. The update data of the master database is preferentially extracted according to the preferential order, and the replica is updated in the order of extraction with the extracted update data.

11 Claims, 7 Drawing Sheets

FIG. 5

INVENTORY DATA

| MERCHANDISE CATEGORY | MERCHANDISE CODE | MERCHANDISE NAME | UNIT PRICE | INVENTORY |
|---|---|---|---|---|
| A | 0001 | A REFRIGERATOR | 100,000 | 15 |
| B | 0002 | B WASHING MACHINE | 60,000 | 12 |
| C | 0032 | C CLEANER | 30,000 | 21 |
| A | 0230 | B REFRIGERATOR | 150,000 | 10 |

PREFERENCE SPECIFICATION a

| REFLECTION TABLE | PREFERENTIAL KEY CONDITION | PREFERENTIAL ORDER |
|---|---|---|
| INVENTORY DATA | MERCHANDISE CATEGORY=A | 1 |
| | MERCHANDISE CATEGORY=B | 2 |

PREFERENCE SPECIFICATION b

| REFLECTION TABLE | PREFERENTIAL COLUMN | PREFERENTIAL ORDER |
|---|---|---|
| INVENTORY DATA | MERCHANDISE CATEGORY, MERCHANDISE CODE, INVENTORY | 1 |
| | MERCHANDISE NAME, UNIT PRICE | 2 |

FIG. 6 PRIOR ART

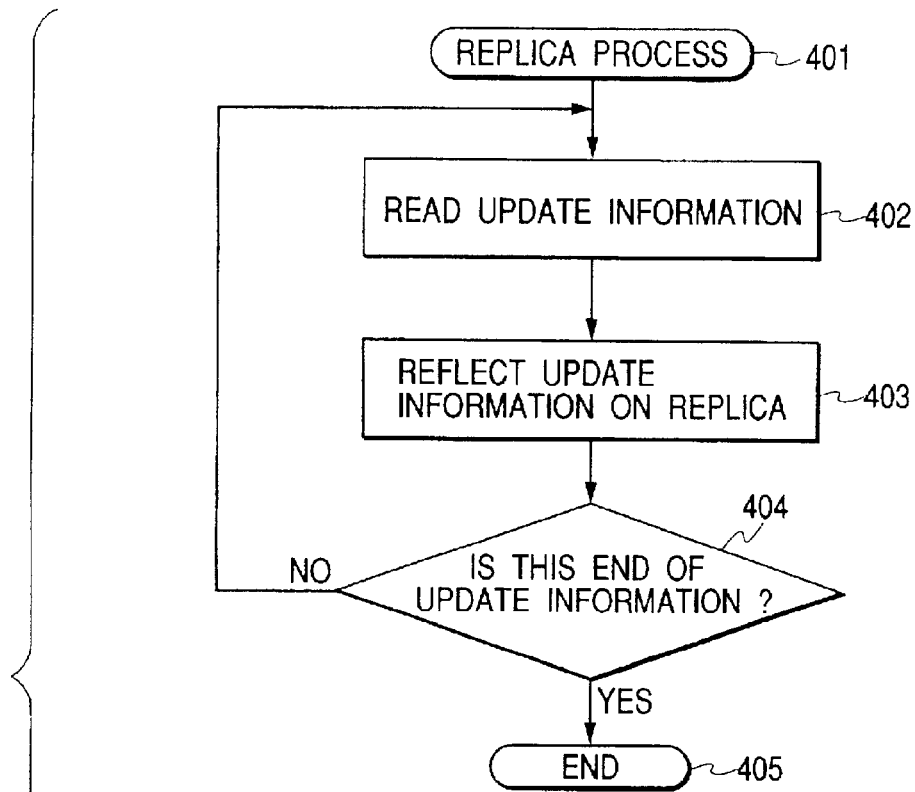

UPDATE INFORMATION DATA CONTENT

| UPDATE TABLE NAME | UPDATE TYPE | RECORD INFORMATION |
|---|---|---|
| INVENTORY TABLE | UPDATE | MERCHANDISE CATEGORY: A, MERCHANDISE CODE: 0001, INVENTORY: 20 |
| MERCHANDISE MASTER | UPDATE | MERCHANDISE CODE: 0022, UNIT PRICE: 120,000 |
| INVENTORY TABLE | UPDATE | MERCHANDISE CATEGORY: B, MERCHANDISE CODE: 0032, INVENTORY: 32 |
| MERCHANDISE MASTER | INSERT | MERCHANDISE CODE: C, MERCHANDISE NAME: C CLEANER, UNIT PRICE: 42,000 |

US 7,016,890 B2

DATABASE SYSTEM, METHOD FOR FORMING REPLICA OF DATABASE, AND COMPUTER-READABLE RECORDING MEDIUM THAT RECORDS DATABASE REPLICA FORMING PROGRAM

BACKGROUND OF THE INVENTION

This invention relates to forming of a replica of a database in a database system.

As described in chapter 23, pp. 624 and pp. 630 of "An Introduction to Database Systems, Volume I, Fifth Edition" by C. J. Date, the replica of database means a replica that should be identical with the master database in the data content and management method. A replica is prepared for avoiding a risk of working interruption due to work distribution of data processing or due to a failure of a computer that stores the data. It is required that the data content is logically identical between the master database and the replica. In order to be identical, it is required to apply the same data update processing as applied to the master database also to the replica to thereby maintain the same content. Heretofore, in order to maintain the same content, the same data update processing as applied to the master database is applied to the replica in the order of the occurrence of the update processing to thereby reflect the update on the replica.

A conventional replica forming process flow and the data content of update information to be used are shown in FIG. 6. When replica forming process is started (401), for example, the update information used for updating the stored master database called as journal or update log is read in the order of occurrence successively (402). The read update information is edited so as to be capable of reflecting on the replica side database (syntax or parameter format used to update the database), and then reflected on the replica side database (403). Whether there is any subsequent update information or not is determined (404), and if the result is YES, then the process is repeated. When the update information reaches to the end of the stored update information, the sequence is brought to an end (405). The data content of the update information contains the update table name 501 that is the table name to be updated in the database, the type of update 502, and the record information 503 for indicating the updated record content. The table name is only an example, and the data element such as table, item, and record is the data content of the update information. The order of data of the update information data content of FIG. 6 is the same as the order of update that has occurred in the master side database, and the update process of the replica occurs in the same order.

In the conventional art, the update process to be applied involves various tables (in other words, various data are mixed). Because update of the replica is applied in the same order as applied actually in updating of the data even though usage and necessity of the data are different respectively, it can occur that the necessary data is not reflected until all the stored update information is updated completely. For example, because update of another table is mixed during update of inventory table when the updated data of the inventory table is wanted in FIG. 6, it is not guaranteed that update of the inventory table has been completed until reflection of the update data is completed for all the update data. Therefore, it is a problem that it takes a long time to get the updated data that is required.

BRIEF SUMMARY OF THE INVENTION

In view of the above, it is the object of the present invention to get the updated data that is required preferentially out of various data correspondingly to the usage and necessity of the data.

In a database system having a master database and a replica thereof, the present invention involves reflection of the update information of the data on the replica not in the order of updating that has occurred in the master side but in the specified order of preference based on the purpose for using.

In detail, a memory unit for storing the order of preference of replica preparation process of a certain data type, an allocation processing unit for preferentially extracting the update data of the database correspondingly to the information, and a management unit for updating the replica successively in the order according to the data extracted by means of the allocation processing means are provided.

BRIEF DESCRIPTION OF THE SEVERAL VIEWS OF THE DRAWING

FIG. 5 is a diagram illustrating an example of the database content and an example of preferential order information of the present invention.

FIG. 6 is a flow chart describing a conventional replica preparation process and an example of the update information data content.

DETAILED DESCRIPTION OF THE PREFERRED EMBODIMENTS

Figure 1:
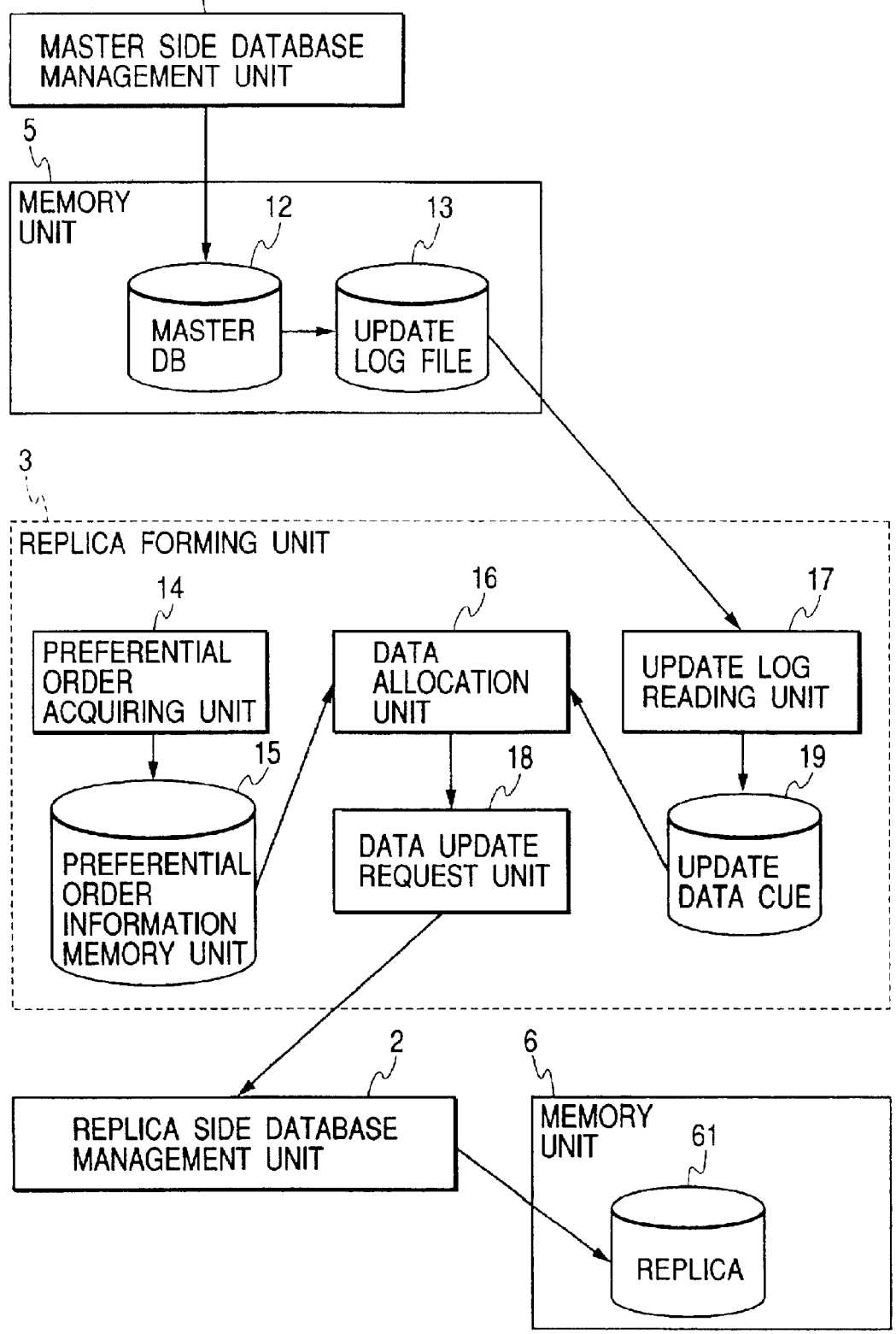
FIG. 1 is a block diagram illustrating one example of the present invention.

Embodiments of the present invention will be described hereinafter with reference to the drawings. FIG. 1 is a structural diagram of a database system of the present invention. A master side database management unit 1 that is a system for managing a master database processes a data update request requested from a user, and updates a master DB 12 of a memory unit 5. The log information that has been got before and after updating is sent out to an update log file 13 when the data is updated for accommodating the failure of the master DB. A replica forming unit 3 reads an update log from the update log file 13 of the master side database, and updates the replica side database system. An update log reading unit 17 for reading an update log stores a necessary update data out of the read update logs in an update data cue 19.

A preferential order of the data, a replica of which is to be prepared, is specified by a use by use of a terminal unit key board. A preferential order acquiring unit 14 acquires the preferential order of the data, and holds it in a preferential order information memory unit 15 as the preferential order information. A data allocation unit 16 receives the preferential order information. The data allocation unit 16 reads out the information in the update data cue 19 successively in the order of updating, extracts the update information in the update data cue 19 in the order from the data type having the highest preference, and sends it out to a data update request unit 18. The data update request unit 18 sends out the received update request to a replica side database management unit 2.

The replica side database management unit 2 reflects the update request received from the data update request unit 18 on a replica DB 61.

The type of the data to which a preferential order is specified means, for example, the update information of the inventory table or merchandise master table in FIG. 6, or, for example, the update information of further subdivided category such as merchandise category A or merchandise category B in the inventory table. The preferential order may involve two-class classification in which the data type is classified into the highest order and others, or may involve multi-class classification in which the data type is classified into the first preferential order, the second preferential order, and so on. In the case of the two-class classification, not an order number but a flag is added simply to indicate the highest preference to be updated first. Otherwise, the data type to be updated preferentially may be stored.

Figure 2:
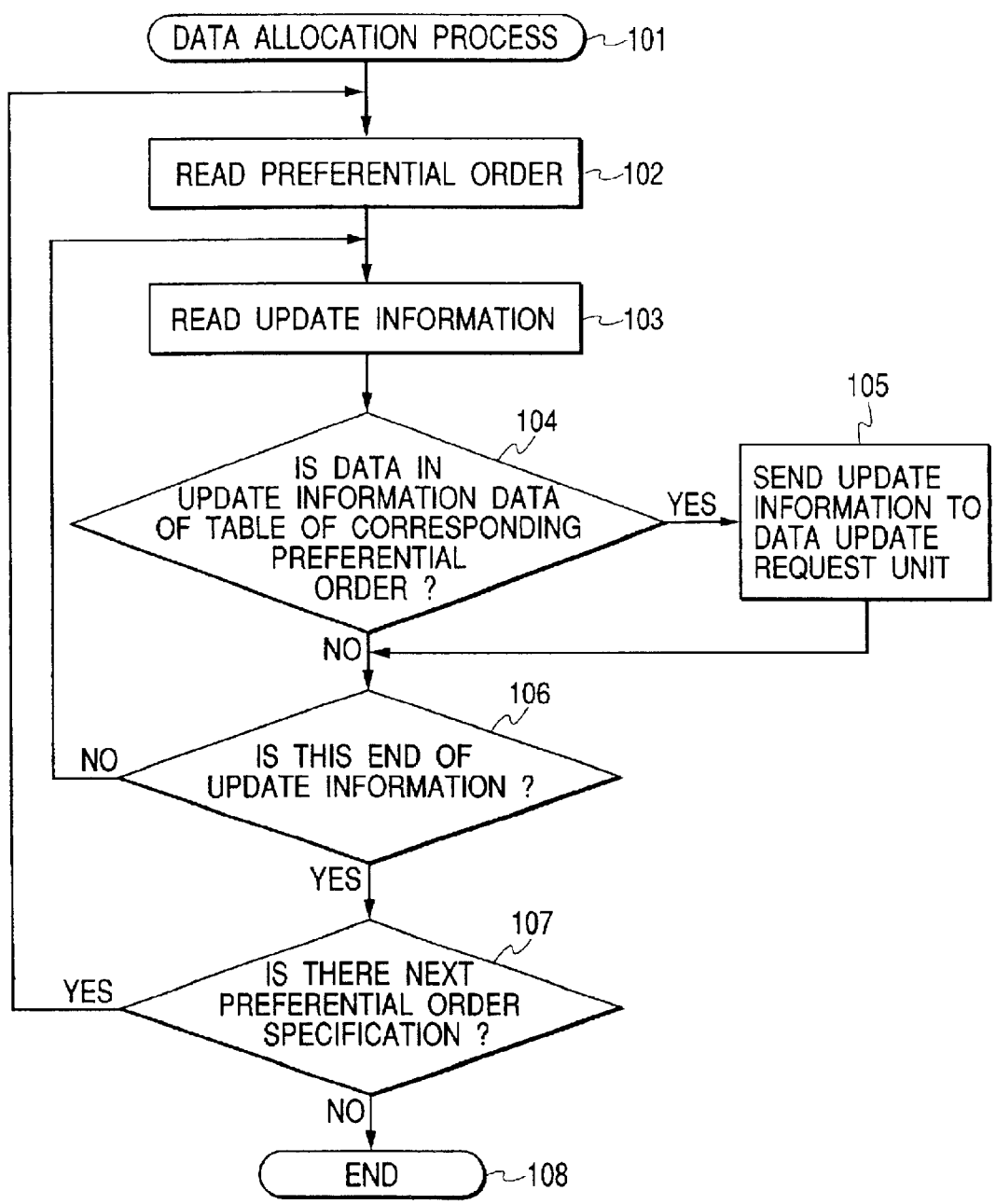
FIG. 2 is a flow chart describing a data allocation unit shown in FIG. 1.

FIG. 2 shows a process flow implemented when the replica forming unit 3 determines the preferential order and allocates the data. It is assumed that the preferential order is specified in the database table unit. When a data allocation process is started (101), the preferential order information of the table having the highest preference out of unprocessed tables is read based on the specified preference specifying information (102). Next, the update information is read from the update data cue 19 (103), and the determination is made whether the table name having the update information is identical with the table name of the preferential order height that is being processed (104). If YES result is obtained, the update information is selected and sent to the data update request unit (105), and the replica side database management unit 2 reflects the update data on the replica.

As described herein above, the process in which the update information is read in the order of updating and the update information having the corresponding preferential order is selectively extracted is referred to as allocation. While the determination is made whether it is the end of the update information or not (106), and the update information is read and the process is repeated until end of the stored update information comes. When the end comes, whether there is the table having the next preferential order or not is determined (107), if there is the table having the next preferential order, then the same process as performed in the case is performed on the table.

As described hereinabove, the data allocation unit 16 selects the stored update information from that of the highest preferential order and transfers it to the data update request unit 18 for updating of the replica, the database is updated from the specified update information having the highest preferential order in the replica. As the result, the updated information having higher preferential order request for using in the replica is rendered available earlier.

Figure 3:
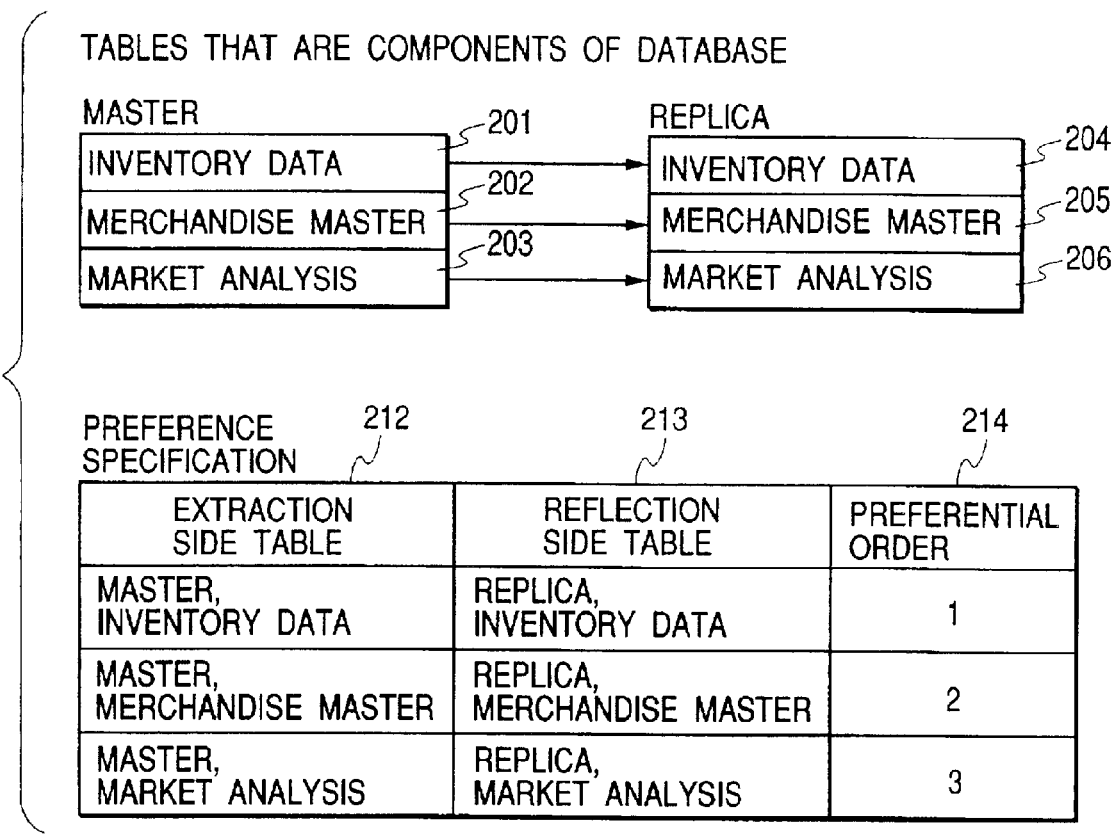
FIG. 3 is a diagram illustrating an example of preferential order specification in the example of the present invention.

FIG. 3 shows an exemplary specification of the preferential order. In this example, three tables, namely the inventory data table 201, merchandise master table 202, and market analysis table 203, are extracted from the tables that are components of the master side database, and the update information is reflected on tables having the same names on the replica side. In the preference specification, the extraction side table 212 and reflection side table 213 are specified, and the preferential order 214 is specified finally. The result is stored in the preferential order information memory unit 15. In this exemplary specification, the updating of the inventory data 204 has the highest preference, and the updating of the market analysis 206 has the lowest preference.

Figure 4:
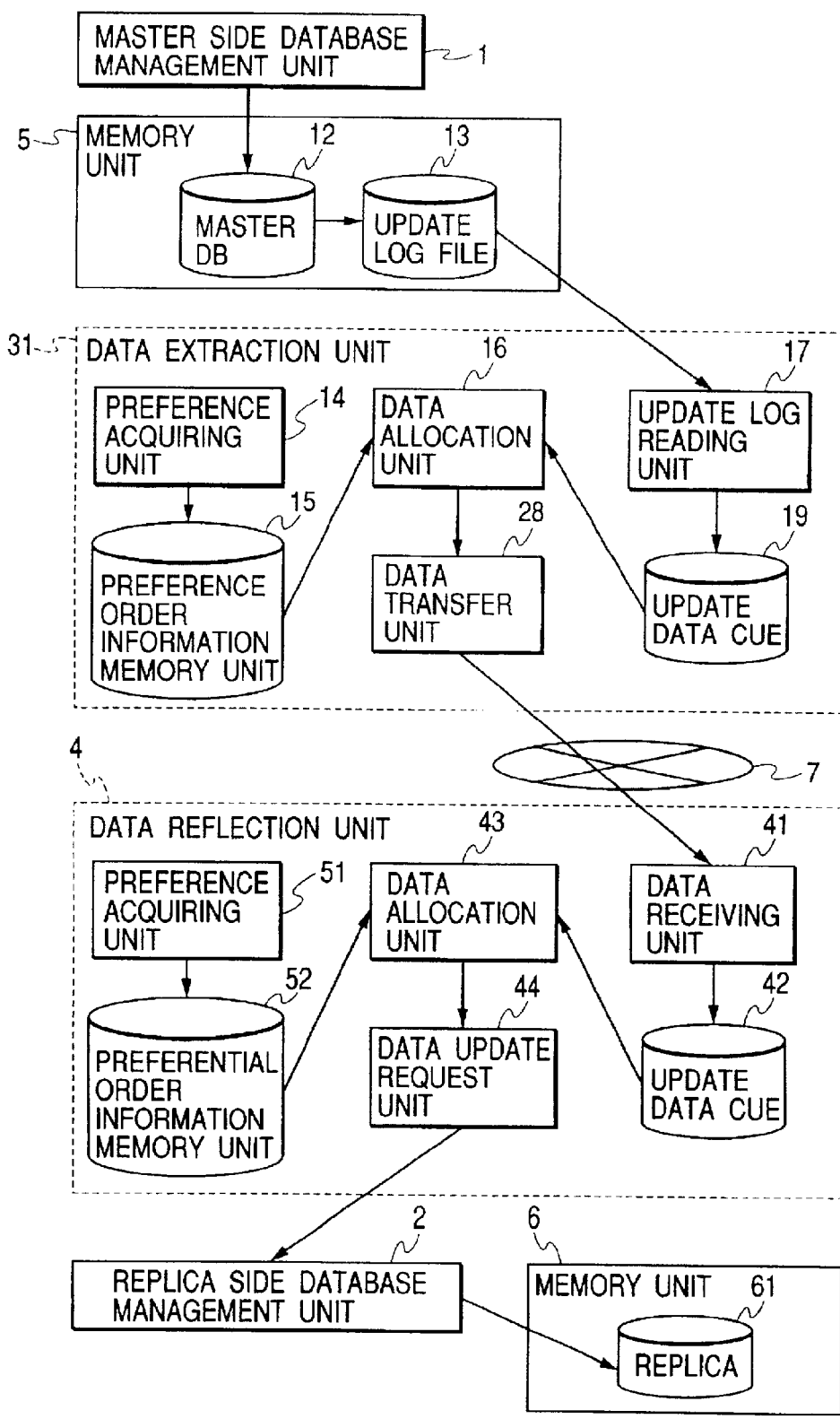
FIG. 4 is a block diagram illustrating another example of the present invention.

FIG. 4 shows an exemplary system structure in which the replica forming unit is provided on the master side database and on the replica side database, both replica forming units are connected each other through a communication means, and the respective replica forming units specify the preference order. The master side replica forming unit is referred to as data extraction unit 31 and the replica side replica forming unit is referred to as data reflection unit 4. These replica forming units are somewhat different from the replica forming unit shown in FIG. 1 in the structure. The data extraction unit 31 and the data reflection unit 4 are disposed separately, and the data is transferred between the data extraction unit 31 and the data reflection unit 4 by use of a communication means such as network, wireless communication network, communication cable, or optical communication network. A data allocation unit 16 of the data extraction unit 31 sends the allocated data to a data transfer unit 28 in the same manner as shown in FIG. 1 and FIG. 2. The data transfer unit 28 sends the transferred update information to a data receiving unit 41 of the data reflection unit 4 by use of the communication means 7, and stores the update information in the update data cue 42.

An example in which the replica forming units disposed separately are used will be described with reference to FIG. 3 and FIG. 5 hereinafter. The exemplary preference specification shown in FIG. 3 is used as the preference specification for the data extraction unit 31. The inventory data shown in FIG. 5 is an exemplary inventory data table stored in the database 12. The preference specification a and the preference specification b are different examples of the preference specification, and stored in a preferential order information memory unit 52. The necessity preference order of the data, namely the inventory data>the merchandise master>the market analysis, is set in the replica side system, and the preference order acquiring unit 14 of the data extraction unit 31 acquires the preference order.

The preference specification in the data reflection unit 4 is shown in FIG. 5. The preference specification a is an example in which the record that preferentially reflects the update information of the inventory data based on the merchandise category 301 is selected. The preferential key condition 312 and the preferential order 313 that are to be referred now is specified out of the inventory data on the replica side to thereby not only preferentially specify the inventory data but also further subdivide the preferential order specification. Herein, the data is updated to the newest information for respective merchandise category data of the inventory data. According to the preferential order, because the merchandise category reflects the inventory of the merchandise A preferentially among the inventory data, the preferential reflection is used effectively when the inventory of the merchandise category A is to be checked during business negotiation.

The preference specification b shows an example in which a necessary item is reflected preferentially. When the database is used for other purpose such as data analysis, only the item that is necessary for analysis is reflected preferentially and the residual items are reflected later. As the result, the analysis can be started earlier and the earlier starting is effective in the case of the time-consuming analysis such as multidimensional analysis. In the preference specification b, the preferential column 322 of the table of the inventory data is specified and the preferential order 323 is specified respectively to thereby reflect the merchandise category, merchandise code, and inventory preferentially.

Examples, in which the update data is extracted preferentially for the category including to the table name on the master side, and further subdivided preferential key condition is specified and the update data is extracted preferentially by specifying the preferential column of the table, are shown hereinbefore. According to the above, the database can be updated based on the subdivided preferential order and also the following effect is obtained. In detail, it is assumed that a plurality of data reflection units 4 and replicas are provided and only the inventory data is transferred from the data transfer unit 28 of the data extraction unit 31. A certain data reflection unit allocates the merchandise category A as the most preferential update data, and another data reflection unit allocates the merchandise category C as the most preferential update data. The replica is preferentially updated so as to satisfy different requests requested from users located on remote areas distant far from the master DB by employing the structure as described hereinabove.

Furthermore, another example is described herein under. The preferential order acquiring unit 14, the preferential order information memory unit 15, and the data allocation unit 16 of the data extraction unit 31 shown in FIG. 4 are removed or not used, and all update data are transferred to the data reflection unit 4 on the replica side through the communication means 7. The allocation preferential order of the update data is determined only by means of the data reflection unit 4. Thereby, the master DB side load is reduced.

Another example, in which a plurality of data reflection units 4 and replicas are provided as shown in FIG. 4 and on the other hand the data extraction unit 31 extracts a plurality of types of update data in parallel, will be described herein under. The plurality of types of update data are transferred to different data reflection units 4 respectively by means of the data transfer unit 28. Thereby, the replica can be updated so as to satisfy the request of users located on remote areas.

Figure 7:
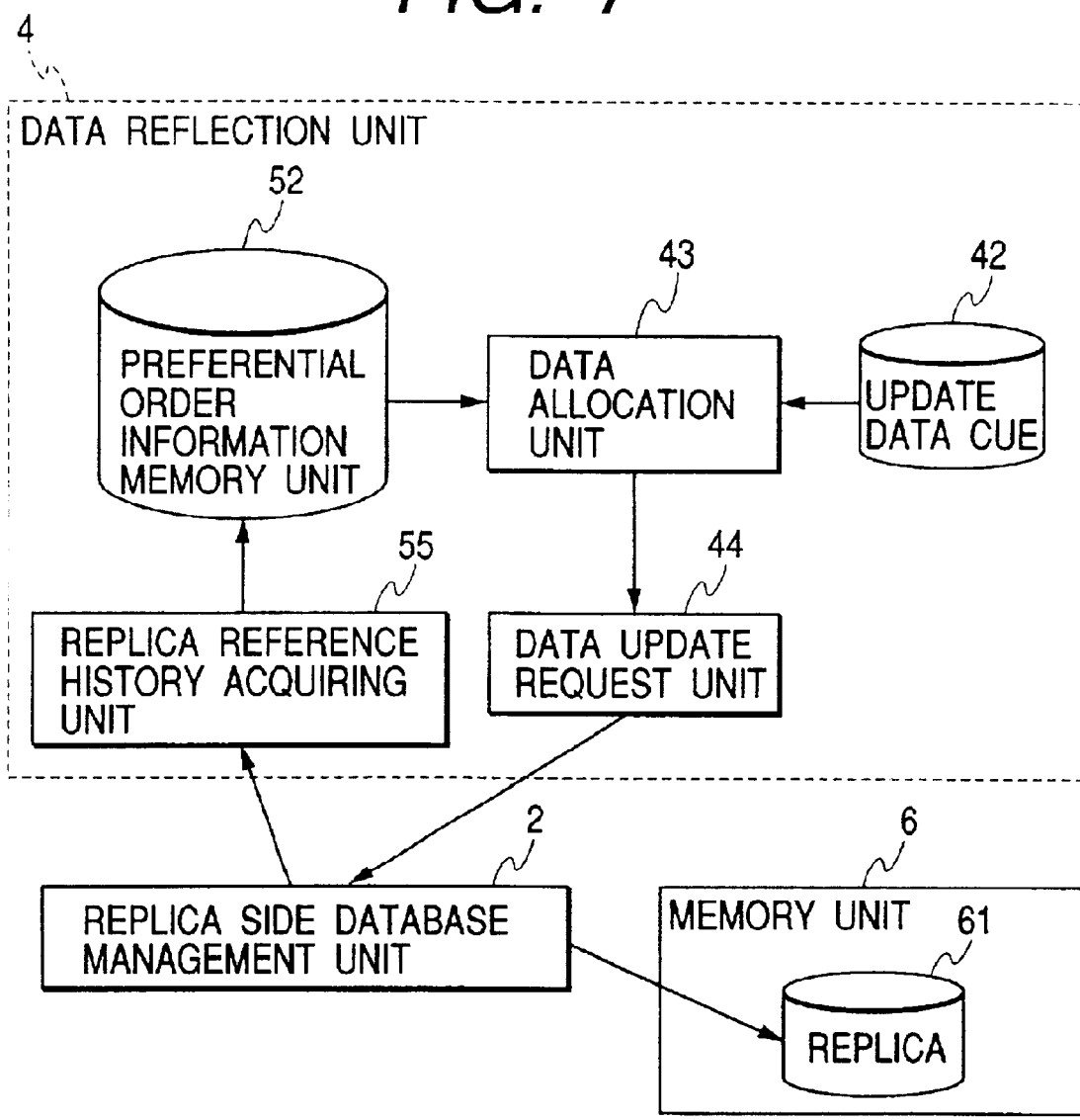
FIG. 7 is a diagram illustrating another example of the present invention.

FIG. 7 shows a diagram illustrating another example of the present invention. In this example, the replica side database management unit 2 has acquired the database reference history information, and the update information of the table of the database that has been referred most frequently is reflected preferentially on the replica. Therefore, the preferential order is specified not based on the user specification but based on the result of statistical processing of actual database reference history. Differently from the example shown in FIG. 4, what table of the replica has been referred in the replica side database management unit 2 is transferred to the replica reference history acquiring unit 55, and the replica reference history acquiring unit 55 sets it to the preferential order information memory unit 52 as the preferential order information. The data allocation unit 43 develops the update information on the data update request unit 44 by use of the information supplied from the preferential order information memory unit 52. Thereby, it is possible that the system judges the preferential order on which the update information is reflected according to the reference frequency of the replica side database used by users and the data of high reference frequency is reflected preferentially as the newest data.

According to the present invention, the update order is changed so that the more necessary data is updated earlier and less necessary data is updated later by means of the allocation unit. However, after all, the update data of all the data types is reflected on the replica in the same order as the update order of the master database. Some data type is updated earlier according the specified preferential order.

Examples in which the database holds the data in the form of table are described hereinbefore, but the present invention is by no means limited to the specified database type. The above-mentioned process is performed by means of a program in the examples. The program is recorded in a computer-readable recording medium.

According to the present invention, it is possible to reflect the update information with selection of the data type, the replica of which is to be prepared preferentially correspondingly to the purpose for using. The information that is used for replica frequently or the information that requires freshness is reflected preferentially, and as the result a replica user can use a replica effectively.

What is claimed is:

1. A database system comprising:

a master database to be updated;

a replica that stores a duplicate of said master database;

a history acquiring unit that records use history of said replica; and an updating unit that receives update data of said master database and updates said replica with preference based on a preferred order of updating of table columns of said master database corresponding to said use history, wherein said preferred order indicates a predefined order of updating particular update data having a higher preferential order prior to updating update data having a lower preferential order.

2. A method for forming a replica of a database in a system having a master database to be updated and a replica thereof, the method comprising steps of:

holding preferential order information indicating a preferred order of updating of preferential table columns of said master database that are to be applied when update data of said master database is reflected on said replica, wherein said preferred order indicates a predefined order of updating particular update data having a higher preferential order prior to updating update data having a lower preferential order;

reading said update data;

extracting said update data according to said preferential order information in such a manner that the update data with higher preferential order of said table columns is executed earlier than the update data with lower preferential order of said table columns; and updating said replica with said update data in the extracted order.

3. A method for forming a replica of a database in a system having a master database to be updated and a replica thereof, the method comprising steps of:

storing preferential keys of a column of a table within said master database of update data of said master database that is to be reflected preferentially according to a preferred order on said replica, wherein said preferred order indicates a predefined order of updating particular update data having a higher preferential order prior to updating update data having a lower preferential order;

reading said update data;

extracting said update data according to stored preferential order of update of said keys in such a manner that the update data with higher preferential order of said keys is executed earlier than the update data with lower preferential order of said keys; and updating said replica with said update data in the extracted order.

4. A computer-readable recording medium having a recorded program for forming a replica of a master database to be updated, the program comprising steps of:
- holding preferential order information indicating a preferred order of updating of preferential table columns of said master database that are to be applied when update data of said master database is reflected on said replica,
- wherein said preferred order indicates a predefined order of updating particular update data having a higher preferential order prior to updating update data having a lower preferential order;
- reading said update data;
- extracting said update data according to said preferential order information in such a manner that the update data with higher preferential order of said table columns is executed earlier than the update data with lower preferential order of said table columns; and
- updating said replica with said update data in the extracted order.

5. A database system comprising:
- a master database to be updated;
- a replica that stores a duplicate of said master database;
- a preferential order information memory unit that holds preferential order information indicating a preferred order of updating either one of a specific database table, preferential table columns and preferential keys of a column with respect to update data of said master database on said replica,
- wherein said preferred order indicates a predefined order of updating particular update data having a higher preferential order prior to updating update data having a lower preferential order;
- an allocation unit that reads said update data and extracting said update data according to said preferential order information in such a manner that the update data with higher preferential order is extracted earlier than the update data with lower preferential order; and
- a management unit that updates said replica with said update data in the extracted order.

6. A database system comprising:
- a master database to be updated;
- a replica that stores a duplicate of said master database;
- a preferential order acquiring unit that receives preferential order information indicating a preferred order of updating preferential table columns of said master database to be applied when update data of said master database is reflected on said replica and that acquires said preferential order information,
- wherein said preferred order indicates a predefined order of updating particular update data having a higher preferential order prior to updating update data having a lower preferential order;
- an allocation unit that reads said update data and, extracts said update data according to said preferential order information in such a manner that the update data with higher preferential order of said table column is extracted earlier than the update data with lower preferential order of said table columns; and
- a management unit for updating that updates said replica with said update data in the extracted order.

7. A database system comprising:
- a master database to be updated;
- a plurality of replicas that store a duplicate of said master database;
- a first control unit, provided in said master database side, that transfers update data in a selected order; and
- a second control unit, provided in each of said replica side, that receives said update data transferred, for extracting from said update data according to stored preferential order information indicating a preferred order of updating of preferential keys of a column of a database table of said update data to be updated,
- wherein said preferred order indicates a predefined order of updating particular update data having a higher preferential order prior to updating update data having a lower preferential order,
- wherein said second control unit extracts update data in such a manner that the update data with higher preferential order of said keys is executed earlier than the update data with lower preferential order of said keys, and for updating said replica with said update data based on the extracted order.

8. A database system comprising:
- a master database to be updated;
- a replica that stores a duplicate of said master database;
- a first control unit, provided in said master database, that transfers update data to a communication means; and
- a second control unit, provided in said replica side, that receives said update data transferred from said communication means, extracts from said update data according to stored preferential order information indicating a preferred order of updating of preferential table columns of said master database of said update data to be updated,
- wherein said preferred order indicates a predefined order of updating particular update data having a higher preferential order prior to updating update data having a lower preferential order,
- wherein said second control unit extracts update data in such a manner that the update data with higher preferential order of said table columns is executed earlier than the update data with lower preferential order of said table columns, and for updating said replica with said update data based on the extracted order.

9. A database system comprising:
- a master database that stores a plurality of types of data;
- a master database management unit that updates said master database in an order of occurrence of an update request according to said data update request to said master database;
- an update log file that stores update log of said master database in the order of updating of said master database;
- an update log reading unit that reads out said update log from said log file;
- a data allocation unit that extracts update data in an order according to preferential order information indicating a preferred order of updating of preferential table columns of said master database of said update data in said update log read by said update log reading unit;
- wherein said preferred order indicates a predefined order of updating particular update data having a higher preferential order prior to updating update data having a lower preferential order;
- a replica that stores the duplicate of data stored in said master database; and
- a replica database management unit that writes said update data extracted by means of said data allocation unit in said replica in said order of extraction.

10. A database system comprising:

a master database to be updated;

a replica that stores a duplicate of said master database;

a first control unit, provided in said master database side, that extracts update data according to stored preferential order information indicating a preferred order of updating a specific database table of said master database of said update data to be updated, wherein said preferred order indicates a predefined order of updating particular update data having preferential order prior to updating update data having a lower preferential order, wherein said first control unit extracts update data in such a manner that the update data with higher preferential order of said database table is executed earlier than the update data with lower preferential order of said database table and transfers said update data to a communication means; and a second control unit, provided in said replica side, that receives said update data transferred from said communication means, for extracting from said update data according to stored preferential order information of table columns of said database table to be updated, wherein said second control unit extracts update data in such a manner that the update data with higher preferential order of said table columns is executed earlier than the update data with lower preferential order of said table columns, and for updating said replica with said update data based on the extracted order.

11. A method for forming a replica of a database in a system having a master database to be updated and a replica thereof, the method comprising steps of:

extracting update data according to stored preferential order information indicating a preferred order of updating a specific database table of said master database to be updated on said master database side, wherein said preferred order indicates a predefined order of updating particular update data having a higher preferential order prior to updating update data having a lower preferential order;

wherein said extracting update data step is performed in such a manner that the update data with higher preferential order of said database table is executed earlier than the update data with lower preferential order of said database table;

transferring said update data to a communication means in the extracted order;

receiving said update data transferred from the communication means on said replica side; and extracting said update data according to stored preferential order information indicating a preferred order of update of preferential keys of a column of said database table to be updated, wherein said extracting update data is performed in such a manner that the update data with higher preferential order of said keys is executed earlier than the update data with lower preferential order of said keys; and updating said replica thereby.

* * * * *